H. B. SWAN.
CORE MACHINE.
APPLICATION FILED SEPT. 14, 1918.

1,311,425.

Patented July 29, 1919.
2 SHEETS—SHEET 1.

Witness
Chas. W. Stauffiger
Anna M. Dorr

Inventor
Harry B. Swan,
By
Attorneys

H. B. SWAN.
CORE MACHINE.
APPLICATION FILED SEPT. 14, 1918.

1,311,425.

Patented July 29, 1919.
2 SHEETS—SHEET 2.

Witness
Chas. W. Stauffiger
Anna M. Dorr.

Inventor
Harry B. Swan,

By
Attorneys

UNITED STATES PATENT OFFICE.

HARRY B. SWAN, OF DETROIT, MICHIGAN.

CORE-MACHINE.

1,311,425.  Specification of Letters Patent.  Patented July 29, 1919.

Application filed September 14, 1918. Serial No. 254,056.

*To all whom it may concern:*

Be it known that I, HARRY B. SWAN, a citizen of the United States of America, residing at Detroit, in the county of Wayne and State of Michigan, have invented certain new and useful Improvements in Core-Machines, of which the following is a specification, reference being had therein to the accompanying drawings.

In the operation of core machines of the type wherein the core box is inverted and the core plate with core withdrawn, exertion is necessary on the part of the operator to shift the machine from the molding to the drawing position.

This invention relates to a core machine wherein the moving parts with the core box and core plate are kept in balance during inversion so that there is no special effort needed on the part of the operator to turn the box over, and whereby the work may be done by persons having slight physical strength, thereby making the machine particularly adaptable for use where female labor is employed.

A further feature is the method of withdrawal or "draw" of the core plate from the box, wherein the weight of the core and plate assist while the plate supports maintain alinement of the parts without the need of any particular skill, strength, or experience on the part of the operator.

The invention consists in the matters hereinafter set forth, and more particularly pointed out in the appended claims.

Figure 1:
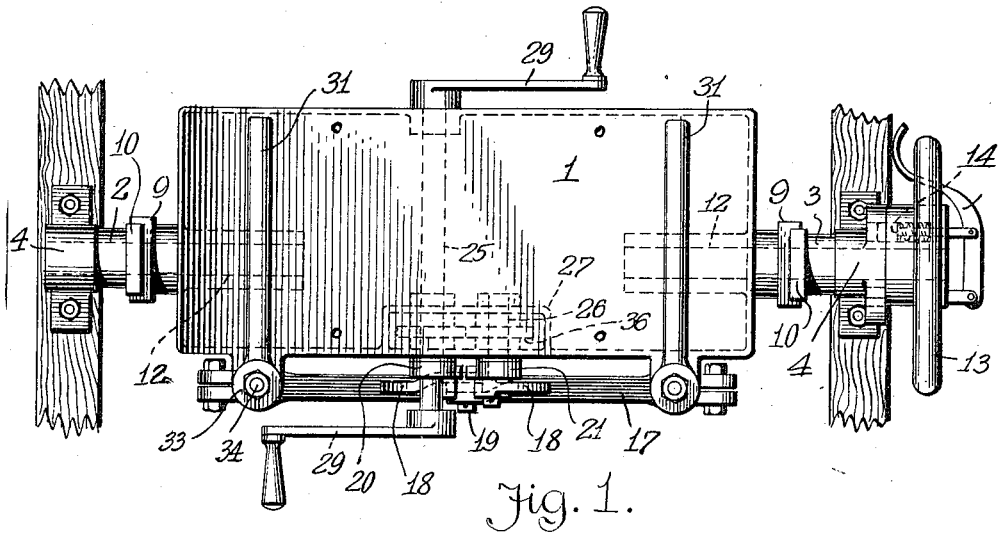
Figure 1 is a view of a core machine embodying features of the invention.
Figure 2:
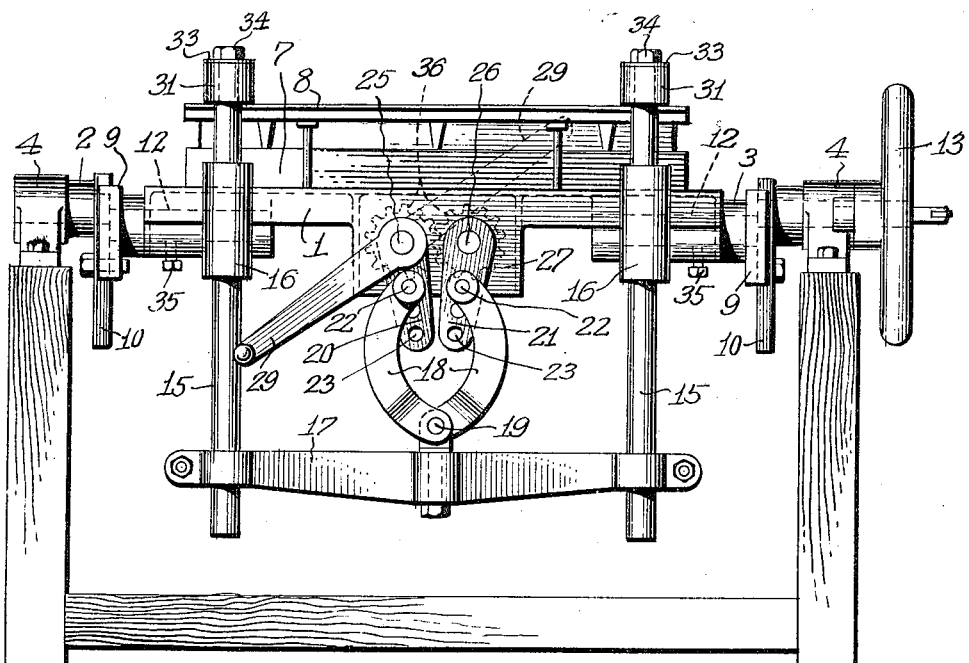
Fig. 2 is a front elevation of the machine in ramming position, with the core box and a plate clamped home ready for inversion.
Figure 3:
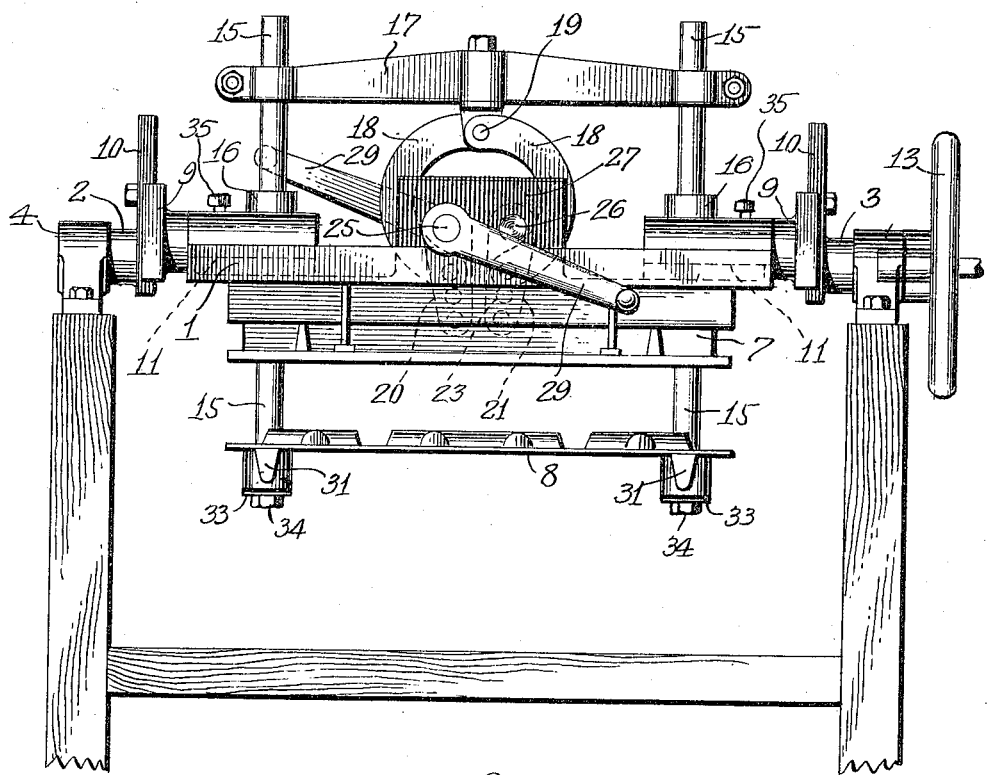
Fig. 3 is a view showing the machine inverted and the core plate withdrawn from the box.

As herein indicated, a base 1 is carried by a pair of trunnions 2 and 3 in bearings 4 which are mounted on any suitable support, dust washers of felt being introduced at the ends of the bearing boxes, if it is preferred.

Adjustability of the base 1 so that the center of gravity of the base and load, consisting of a core box 7 and plate 8, may be brought into coincidence with the axis of the trunnions, is attained by means of a two-part construction of the trunnions 2 and 3, whereby brackets 9 are adjustably secured on arms 10 transverse to the shafts 11 and 12 of the trunnions. For further manipulation the shaft 12 is elongated and is provided with a wheel 13 with a spring projected latch 14 engaging the face of the companion bearing box so as to lock the base in horizontal or in inverted position. The brackets 9 are also adjustable longitudinally on the base to which they are secured by cap screws 5 or like fastening means.

A pair of draw bars 15 are longitudinally reciprocable in bearings 16 formed on one margin of the base 1, and are connected by an adjustable cross bar or yoke 17 whereby they may be moved simultaneously through the medium of a pair of oppositely disposed links 18 pivoted on a common pin 19 to the middle portion of the yoke, and at the other end to crank arms 20 and 21 by studs 22 adapted to engage in any of a plurality of apertures 23 formed in the arms. This together with adjustable connection between the yoke and draw bars, permits the machine to accommodate core boxes and drags of different sizes and lengths of draw.

A pair of parallel shafts 25 and 26 on which the crank arms 20 and 21 are secured are journaled transversely across the base in suitable bearings. They are connected to turn together by means of gears 36 suitably housed in a casing 27 formed on the base. A crank 29 at the ends of the shaft 25 on opposite sides of the base affords means for rotating the shafts.

As a detail of good construction, an annular cap is inserted in each end of each bearing 16 to retain dry graphite or like lubricant therein and thus prevent the bearings from cutting under the influence of dirt which would otherwise be drawn into them.

A pair of clamping arms 31 are each swiveled on the reduced upper end portions of the draw bars 15, each by a suitable washer 33 and screw 34 or the like. These arms are adapted to swing over the base, and a core box secured thereon by suitable means such as bolts engaging slots or apertures in the base.

In operation, the machine is adjusted as shown in Fig. 1, so that the center of gravity of the core box and drag or draw plate thereof constituting the load, and of the base and clamping parts is coincident with the axis of the trunnions. The core box is rammed, the plate placed thereon and the clamping arms drawn down by manipulation of the cam shafts and cranks so that the right line position assumed by the pivots of the connecting links and crank arms prevent dislocation of the parts. The machine is then inverted and this is readily accomplished by the withdrawal of the latch, the machine being turned on the trunnions in its balanced condition without any effort beyond that necessary to overcome the friction of the bearings and the inertia.

When inverted, rotation of the crank shafts lowers the plate and core away from the core box and permits the withdrawal of the spring. Because of the gear connection between shafts and the angular disposition of the crank arms and links relative to each other, a parallel motion is insured so that the core falls away from the box without special attention on the part of the operator and without injury or disruption to the core. The plate with core is easily slid off the clamping arms.

The machine is then readily reverted to original position, the core box again filled and a nowel, core print plate or draw clamped home on the same, as before.

As a result of this construction, the machine is readily adjustable for different dimensions of core boxes, and regardless of the weight placed upon the machine, is easily tilted without special effort, into drawing position. This enables the machine to be used by female operators who can turn out a great deal of work without particular fatigue as there is no lifting of the parts and no special effort required.

From the foregoing it will be noted that the machine may be used in connection with a nowel, drag or other well known elements in the art of molding and consequently can be used for any kind of molding, as well as core making.

Obviously, changes in the details of construction may be made without departing from the spirit of my invention and I do not care to limit myself to any particular form or arrangement of parts.

What I claim is:—

1. A core molding machine comprising means for supporting and inverting a core box and core plate thereon, adjustable to bring the center of gravity of support and load into substantial coincidence with the axis of the motion of the support.

2. A core molding machine comprising means for supporting and inverting a core box and core plate thereon, adjustable to bring the center of gravity of the support and load into substantial coincidence with the axis of motion of the support, and means on the support reciprocable to and from it adapted to hold the core plate on the box during inversion, and to lower the plate and core from the box when the latter is inverted.

3. A core molding machine comprising means for supporting and inverting a core box and core plate thereon, adjustable to bring the center of gravity of the support and load into substantial co-incidence with the axis of motion of the support, and means on the support reciprocable to and from the latter and in parallel relation thereto adapted to hold the core plate on the box during inversion and to lower the plate from the box when the latter is inverted while maintaining it in parallel relation to the latter.

4. A core molding machine comprising means for supporting a core box, means for pivotally holding the support, adjustable to bring the center of gravity of the support and its load into substantial coincidence with the pivot axis, a core plate, and means on the support reciprocable to and from the latter and in parallel relation thereto adapted to hold the core plate on the box during inversion and to lower the plate from the box when the latter is inverted.

5. A core molding machine comprising a base provided with trunnions adjustable to bring the base and any load thereon into substantial coincidence with the axis of the trunnions, journals for the trunnions, a core plate, and means carried by the support reciprocable to and from the latter adapted to hold the core plate on the box during inversion and to lower the core plate from the box when the latter is inverted.

6. A core molding machine comprising a base for supporting a core box, trunnions on which the base is tiltable, bearings for the trunnions, draw plate securing means reciprocably mounted on the base adapted to clamp a draw plate on a core box mounted on the base during inversion of the latter and to lower said plate away from the box when the base is inverted, and means on the base for reciprocating the draw plate securing means.

7. A core molding machine comprising a base, trunnions for supporting the base on which the latter is adjustable to bring the center of gravity of the base and the load thereon in coincidence substantially with the axis of the trunnions, means mounted on the base reciprocable to and from the latter, for holding a draw plate on a core box mounted on the base during inversion of the base and for lowering the plate away from the base after inversion, and manually operable means connecting the base and draw plate holding means for reciprocating the latter and maintaining it in parallel relation to the base.

8. A core molding machine comprising a base plate, trunnions mounted on each end of the base, bearings for the trunnions, draw bars longitudinally reciprocable in bearings on the base at right angles to the plate, clamping bars journaled on the draw bars over the plate and base, a pair of parallel crank shafts journaled on the base, gears connecting the shafts to turn together, cranks each secured on a shaft, and a pair of links having a common pivotal connection with the draw bars, each pivoted at the other end to one of the shaft crank arms, and means for locking the base in initial and inverted positions.

9. A core molding machine comprising a pivotally supported base for carrying a core box and draw plate adjustable to bring the center of gravity of the base and load thereon into substantial coincidence with the pivot axis, means reciprocable on the base in parallel relation thereto, adapted to clamp the draw plate on the core box secured to the base during inversion of the base and to lower the draw plate away from the box after inversion, and means on the base for reciprocating the clamping means adapted to lock the clamping means in initial holding position during and after inversion.

10. A core molding machine comprising a base, a pair of oppositely disposed, alined brackets longitudinally adjustable on the base, a pair of trunnions having radial arms on which the brackets are adjustably secured, means for locating one of the trunnions, bearings for the trunnions, a latch secured to one of the trunnions and adapted to engage the adjacent bearings for securing the base in initial and in inverted positions, a pair of guide bearings mounted transversely on the base in parallel relation, a pair of draw bars longitudinally reciprocable in the guide bearings at right angles to the base, a yoke adjustably secured at either end to the draw bars, a pair of arms each journaled on the end portions of a draw bar to swing over the base in substantially parallel relation thereto, a pair of parallel shafts journaled on the base transversely to the draw bars, gears connecting the shafts to turn in unison, a pair of oppositely disposed links having a common connection with the yoke between the draw bars, a crank arm on each shaft adjustably pivoted to the free end of a companion link, the parts being adjustable to hold the pivot connections of the crank shaft arms, links and yoke in line when the parts are in clamping position, and means for manually rotating either shaft.

In testimony whereof I affix my signature in the presence of two witnesses.

HARRY B. SWAN.

Witnesses:
ANNA M. DORR,
KARL H. BUTLER.